United States Patent
Bikson

(10) Patent No.: US 12,281,273 B1
(45) Date of Patent: Apr. 22, 2025

(54) SYSTEM AND METHOD FOR CLEANING OF BIOGAS

(71) Applicant: Unconventional Gas Solutions, LLC, Houston, TX (US)

(72) Inventor: Benjamin Bikson, Newton, MA (US)

(73) Assignee: Unconventional Gas Solutions, LLC, Houston, TX (US)

( * ) Notice: Subject to any disclaimer, the term of this patent is extended or adjusted under 35 U.S.C. 154(b) by 0 days.

(21) Appl. No.: 18/424,094

(22) Filed: Jan. 26, 2024

(51) Int. Cl.
| | |
|---|---|
| C10L 3/10 | (2006.01) |
| B01D 53/02 | (2006.01) |
| B01D 53/22 | (2006.01) |
| B01D 53/26 | (2006.01) |
| B01D 53/52 | (2006.01) |
| B01D 53/62 | (2006.01) |
| B01D 53/84 | (2006.01) |

(52) U.S. Cl.
CPC .............. *C10L 3/103* (2013.01); *B01D 53/02* (2013.01); *B01D 53/226* (2013.01); *B01D 53/228* (2013.01); *B01D 53/229* (2013.01); *B01D 53/265* (2013.01); *B01D 53/526* (2013.01); *B01D 53/62* (2013.01); *B01D 53/84* (2013.01); *C10L 3/104* (2013.01); *B01D 2256/245* (2013.01); *B01D 2257/104* (2013.01); *B01D 2257/304* (2013.01); *B01D 2257/504* (2013.01); *B01D 2257/80* (2013.01); *B01D 2258/05* (2013.01); *C10L 2290/26* (2013.01); *C10L 2290/542* (2013.01); *C10L 2290/548* (2013.01)

(58) Field of Classification Search
None
See application file for complete search history.

(56) References Cited

U.S. PATENT DOCUMENTS

| | | | |
|---|---|---|---|
| 5,401,300 | A | 3/1995 | Lokhandwala et al. |
| 8,221,524 | B2 | 7/2012 | Mitariten |
| 8,999,038 | B2 | 4/2015 | Ungerank et al. |
| 2007/0095205 | A1* | 5/2007 | Palumbo .............. B01D 53/229 95/52 |
| 2012/0264197 | A1 | 10/2012 | Mitariten |
| 2020/0179868 | A1 | 6/2020 | Ding |

(Continued)

FOREIGN PATENT DOCUMENTS

FR 3019061 A1 10/2015

OTHER PUBLICATIONS

Dumont, Eric, "H2S separation from biogas using bioreactors: a review", International Journal of Energy and Environment, 2015, 6 (5), pp. 479-498. (Year: 2015).*

(Continued)

*Primary Examiner* — Jason M Greene
(74) *Attorney, Agent, or Firm* — FORGE IP, PLLC

(57) ABSTRACT

An improved process for removing acid gases from raw biogas streams, such as biogas from landfills or biogas from controlled anaerobic digestion, provides for efficient $H_2S$ removal combined with carbon dioxide removal. The biogas is treated in a biological hydrogen sulfide removal system integrated with a membrane gas separation system. The combined system provides for efficient acid gas removal while simultaneously limiting oxygen carryover into the treated product stream by beneficially utilizing oxygen in the biological desulfurization system.

18 Claims, 1 Drawing Sheet

(56) References Cited

U.S. PATENT DOCUMENTS

2021/0339189 A1* 11/2021 Winkler .............. B01D 53/229
2023/0114525 A1 4/2023 Henry

OTHER PUBLICATIONS

Aita, Bruno C. et al., "Biofiltration of H2S-rich biogas using Acidithiobacillus thiooxidans", Sep. 2015, Clean Techn Environ Policy 18 (3) 689, DOI 10.1007/s10098-015-1043-5.
Anjan K. Datta et al., "Optimization of membrane unit for removing carbon dioxide from natural gas"; Journal of Membrane Science 283 (2006) 291-300.
Dumont, E. "H2S removal from biogas using bioreactors: a review". International Journal of Energy and Environnement, 2015, 6 (5), pp. 479-498.
Li, et al., "Biological technologies for the removal of sulfur containing compounds from waste streams: bioreactors and microbial characteristics"; World J Microbiol Biotechnol (2015), 31 (10) 1501, DOI 10.1007/s11274-015-1915-1.
Makaruk, A. et al. "Membrane biogas upgrading processes for the production of natural gas substitute"; Separation and Purification Technology 74 (2010) pp. 83-92.
Pachaiappana, R. et al., "A review on biofiltration techniques: recent advancements in the removal of volatile organic compounds and heavy metals in the treatment of polluted water"; Bioengineered 2022, vol. 13, No. 4, 8432-8477.

* cited by examiner

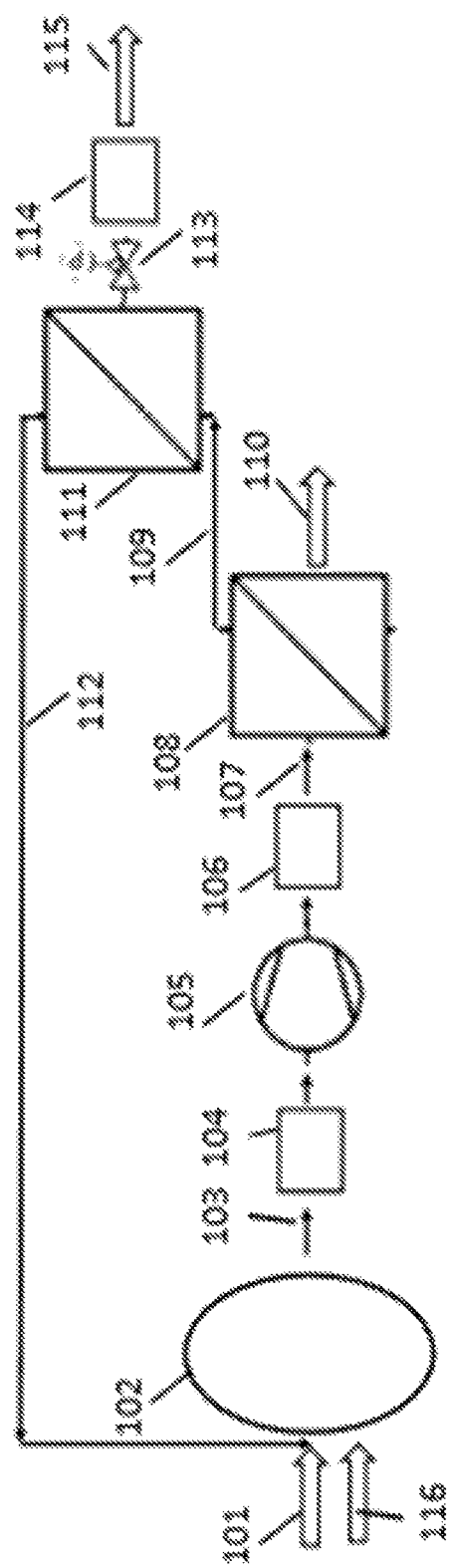

SYSTEM AND METHOD FOR CLEANING OF BIOGAS

FIELD OF THE INVENTION

This invention relates to a system and method for removing acid gases, such as carbon dioxide and hydrogen sulfide, from a range of biogas streams by a membrane purification process combined with a biological removal of hydrogen sulfide.

BACKGROUND OF THE INVENTION

Methane is one of the main components of the primary energy used in the United States. Much of the raw methane-containing gas sources are "subquality," that is, the raw gas exceeds pipeline specifications in carbon dioxide, and/or hydrogen sulfide, sometimes nitrogen and oxygen. The gas must be treated to meet pipeline specifications. Renewable natural gas (RNG) generated from biogas is an emerging alternative energy source comprised of methane.

Biogas is obtained by a complex degradation process of organic matter that is performed by a set of bacteria under anaerobic conditions. Biogas is produced from a variety of organic materials in plants ranging from sewage treatment plants to organic waste utilization in landfill sites, to farm biogas production that utilizes ecologically pure crops and manure. The resulting gas consists primarily of methane and carbon dioxide together with smaller amounts of other gases and vapors, such as hydrogen sulfide, ammonia, volatile organic compounds (VOCs), and additionally of siloxanes for landfill gas. As shown by a considerable number of biogas plants around the world, biogas production and utilization can result in additional available energy with reduced emission of methane and carbon dioxide to the atmosphere and the production of valuable fertilizer. Several biogas utilization methods can be applied. Presently, the most popular approach is the production of combined heat and power (CHP) by means of internal combustion engines. The CHP process can be deployed if heat consumers are in the vicinity of the plant. However, this requirement cannot be met in most cases. As a result, the excess heat energy is frequently vented into the atmosphere lowering the overall energy production efficiency and requiring additional electrical power for heat removal. The biogas upgrading to pipeline natural gas quality avoids this shortcoming and generates renewable natural gas (RNG). The upgraded biogas is in the form of a natural gas substitute and can be injected into existent natural gas grids or used as a vehicle fuel using the natural gas infrastructure. The upgraded biogas can be distributed at a low cost and utilized with a higher efficiency by customers. However, to generate renewable natural gas, the raw biogas must be upgraded to pipeline specification by removing multiple impurities, wherein key impurities are hydrogen sulfide, and the largest volumetric impurity component carbon dioxide.

The biogas contains a variable, but usually high, carbon dioxide content from 25 to 60 volumetric percent. The $H_2S$ concentration in the biogas usually ranges from 10 to 5,000 ppmv but can reach up to 30,000 ppmv (3% v/v) in some cases. To be used as a source of energy to generate heat and/or electricity as renewable natural gas, biogas must be cleaned ($H_2S$ and siloxane removed) and upgraded ($CO_2$ removed to product specification). The raw biogas can further contain oxygen in variable amounts that can require removal to meet pipeline specifications and a significant amount of nitrogen that may require removal as well to meet pipeline specifications for total inert components.

A large fraction of the raw biogas gas streams exceeds the typical acid gas pipeline specification for carbon dioxide of no more than 2% and for hydrogen sulfide below 4 ppm. Since the feed gas may contain other sulfur-based compounds and inert gas nitrogen, the pipeline natural gas typically must contain 0.5 grains of total sulfur or less per 100 cubic feet of gas with total non-hydrocarbons of 4% or less. Before biogas can be sent to the supply pipeline, the carbon dioxide and hydrogen sulfide content must be reduced. Various techniques for acid gas removal, including absorption into an amine solution, cryogenic separation, adsorption, and membrane separation, have been used in the industry. Each has its advantages and disadvantages. It is also known to use a combination of these unit separation processes for acid gas removal.

Methods heretofore known for the purification of biogas, in particular, carbon dioxide gas removal, may be divided roughly into the following classifications:

(a) Methods involving absorption separation unit operations, wherein water or amine absorbent-based water solutions or physical solvents are utilized as an absorption media.

(b) Methods involving membrane separation unit operations, wherein the carbon dioxide is removed by preferential permeation through a polymeric membrane.

(c) Methods involving adsorption unit separation operations, wherein the carbon dioxide is removed by a thermal or pressure swing adsorption process. The most common adsorbent is activated carbon but other adsorbents, including zeolites, such as zeolite 5A, molecular sieve carbons, silica gel, activated alumina, or other adsorbents selective for carbon dioxide over methane are utilized as well.

(d) Methods involving liquefaction and cryogenic distillation are utilized when products in a liquified form are desired.

Membrane processes for biogas upgrading have been reviewed by A. Makaruk et al. in Separation and Purification Technology 74 (2010) pp. 83-92.

Membrane units remove carbon dioxide and hydrogen sulfide by selective permeation of acid gases from high pressure to low pressure across a polymeric membrane. Membrane systems have numerous attractive features, such as intrinsic simplicity, the lack of cyclic valve switching, and the ability to generate dry biomethane at elevated pressure. Polymeric membranes can lose treating capacity over time due to exposure to contaminants, such as heavy hydrocarbons, and adsorption processes are commonly used as a pretreatment for the removal of water, heavy hydrocarbons, and other contaminants. The intrinsic simplicity of membrane gas separation processes make them attractive for biogas processing to produce renewable natural gas. However, the efficient removal of carbon dioxide from industrial process streams with a high methane product recovery by membrane processes requires staging. The membrane staging configuration must be optimized toward the specific application. Optimization of membrane units for removing carbon dioxide from natural gas is reviewed by Anjan K. Datta et al. in the Journal of Membrane Science 283 (2006) 291-300. A multistage membrane process for generating high-purity biomethane combined with high recovery from raw biogas is disclosed in U.S. Pat. No. 8,999,038. However, there is a disadvantage connected with a high flow of recycled permeated gas that leads to increases in compressor capacity and power consumption. To generate pipeline specification natural gas by a state-of-the-art multi-stage membrane system with a high 99.5% methane recovery, an increase of more than 50% in compressor capacity is required for the feed raw biogas compression.

Activated carbon adsorbents are effective in $H_2S$ removal, including impregnated carbon adsorbents. Biogas feed streams frequently contain oxygen. In the presence of oxygen, $H_2S$ is oxidized and deposited in the form of sulfur on the activated carbon. Depending on the fermentation processes, the biogas produced may be too low in oxygen (<0.02% mol) to allow the chemical reaction on the impregnated activated carbons to transform the $H_2S$ into elemental sulfur(S) deposited within the pores of the carbons. In this case, the loading rate of the activated carbons (quantity of adsorbed $H_2S$ relative to the mass of carbon active) is greatly reduced and the life of the activated carbon charge is also reduced. Consequently, the renewal of activated carbons is more frequent and entails additional operating costs. It has been proposed in French Patent Application No. FR3019061A1 to inject air or oxygen into the biogas to increase oxygen concentration and improve $H_2S$ removal efficiency by activated carbon. However, excessive amounts of oxygen or nitrogen may accumulate in the biogas and necessitate downstream removal to meet pipeline specifications.

F. Winkler, in U.S. Patent Application Publication No. US 2021/0339189 A1, discloses a biogas treatment system comprised of an activated carbon $H_2S$ removal adsorbent bed in front of a three-stage membrane system. The oxygen content and relative humidity can be adjusted for the optimum adsorption capacity of the hydrogen sulfide adsorber by recycling permeate from the second membrane separation stage, which receives the retentate of the first membrane separation stage, to a point upstream of the hydrogen sulfide adsorber.

Currently, most of the adsorption-based techniques employed in the removal of $H_2S$ from biogas have a chemical base, with high material costs and secondary pollutant generation. In particular, the hydrogen sulfide removal by adsorption on the activated carbon is associated with the formation of sulfur, which deposits in the adsorber and degrades removal efficiency. Treatment of biogas feeds with high concentrations of hydrogen sulfide leads to frequent replacement of the adsorbent and increased costs of both impregnated activated carbon replacement and its disposal. For this reason, it is uneconomical to remove high quantities of hydrogen sulfide by adsorption on activated carbon.

Biological processes for $H_2S$ removal have become effective and economical alternative techniques to traditional gas-treatment systems based on physicochemical methods. The biological processes of $H_2S$ removal are reviewed in the following publications: E. Dumont, "$H_2S$ removal from biogas using bioreactors: a review", International Journal of Energy and Environment, Volume 6, Issue 5, 2015, pp. 479-498; Bruno Carlesso Aita et al., "Biofiltration of $H_2S$-rich biogas using *Acidithiobacillus thiooxidans*", Clean Technology Environmental Policy, 18 (3) 689, DOI 10.1007/s10098-015-1043-5; Lin Li et al., "Biological technologies for the removal of sulfur-containing compounds from waste streams: bioreactors and microbial characteristics", World Journal Microbiology Biotechnology., 31 (10) 1501.

Biological desulfurization technologies are well established and their use for biogas treatment can be generically divided into segments that differ in methods of oxygen introduction and utilization in the bioprocess. Oxygen is the prerequisite to the vital activity of bacteria and to enable $H_2S$ oxidation and removal that proceeds according to the following mechanisms:

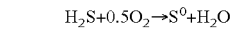

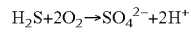

The process proceeds with $H_2S$ oxidation to elemental sulfur and/or sulfuric acid. The oxygen supply and process conditions determine the balance between sulfur and sulfuric acid formation.

The raw biogas produced by anaerobic digestion contains some oxygen in a variable concentration. To enable efficient $H_2S$ removal by a biological process the oxygen concentration must be managed. A low oxygen concentration can lead to incomplete $H_2S$ removal. However, oxygen excess is undesirable since it will accumulate in the product RNG. RNG product specification can vary but pipeline specifications typically have stringent limits on the residual oxygen content. Excess oxygen is commonly removed by the deoxygenation process, wherein the oxygen is reacted with methane at high temperatures and converted into water vapor and carbon dioxide. The process consumes product methane and necessitates an additional dehydration step to remove water.

M. J. Mitariten, in U.S. Pat. No. 8,221,524, discloses a combined membrane adsorption process wherein the bulk of the carbon dioxide and some of the oxygen are removed from the feed gas by a membrane process followed by a PSA process to remove residual oxygen. The use of a membrane process to remove oxygen from biogas is further described in U.S. Patent Application Publication No. US 2023/0114525 A1. The process applies to biogas streams with limited oxygen content only and the low oxygen removal efficiency leads to a significant methane product loss.

During the biological desulfurization process, hydrogen sulfide is mostly oxidized to sulfuric acid and small quantities of elemental sulfur precipitate, wherein the latter is removed with a water wash. The clogging of the biological treatment system due to the deposit of elemental sulfur $S_0$ and biomass accumulation represents the most common problem in bioprocesses treatment operation and is frequently the result of oxygen imbalance. Injection of supplemental oxygen is frequently required to manage bioprocess treatment operations. This, in turn, increases oxygen content in the treated gas and frequently necessitates downstream oxygen removal to meet pipeline specifications. Atmospheric air can be injected as an oxygen source in some cases which, in turn, increases nitrogen content in the produced biomethane that can exceed pipeline specifications.

It is known to utilize membranes with tailored $H_2S$ removal characteristics in biogas treatment. Y. Ding and M. Mitariten, in U.S. Patent Application Publication No.: US 2020/0179868 A1, disclose a biogas treatment process that removes carbon dioxide and hydrogen sulfide from the biogas to generate pipeline specification RNG. Multiple types of membranes with properties tailored to hydrogen sulfide and carbon dioxide removal are utilized to remove acid gases. However, low membrane selectivity limits the range of biogas streams that can be treated to meet pipeline specifications, the process is accompanied by an increase in methane losses, and the hydrogen sulfide removed by membrane processes must be sent to flair leading to significant SOX emissions.

K. A. Lokhandwala et al., in U.S. Pat. No. 5,401,300, titled "Sour Gas Treatment Process Including Dehydration of the Gas Stream," disclose a membrane-based process for hydrogen sulfide removal combined with gas dehydration.

However, low membrane selectivity limits the range of biogas streams that can be treated to meet pipeline specifications, the process is accompanied by an increase in methane losses and the hydrogen sulfide removed by the membrane processes must be sent to flair leading to significant SOX emissions.

M. J. Mitariten, in U.S. Patent Application Publication No. US 2012/0264.197 A1, titled "$H_2S$ Removal from Contaminated Gases," discloses a process for removing hydrogen sulfide from a raw natural (US) gas stream, such as biogas from landfills or controlled anaerobic digestion. The process comprises passing the natural gas stream through a separation unit, such as a PSA unit, to form a product stream that consists of a high concentration of methane and a low-pressure tail gas containing hydrogen sulfide, passing the tail gas through a biofilter which includes bacteria that degrades the hydrogen sulfide to sulfur and sulfate compounds which are washed from the biofilter. The tail gas stream after the treatment in the biofilter can be flared into the atmosphere without significant SOX emissions.

Within the current state of the art, membrane systems offer significantly lower investment costs and ease of operation. A low membrane selectivity, however, makes it impossible to produce high-purity gases at high recovery in a single-stage process, necessitating multi-membrane staging. State-of-the-art membrane systems are efficient in bulk acid gas removal but are characterized by high electrical power consumption related to recycled gas recompression to attain high product purity with high recovery. The hydrogen sulfide removed by membrane processes as a low-pressure permeate gas is commonly sent to flair leading to significant SOX emissions.

Biological hydrogen sulfide removal systems are efficient but require excess oxygen for efficient operation. This leads to oxygen being retained in the processed stream. Bioreactors can suffer from clogging due to the deposit of elemental sulfur if oxygen availability is limited.

Thus, there is still a need for an improved energy-efficient and lower-cost acid gas removal process from biogas that overcomes the limitations of the prior art.

SUMMARY OF THE INVENTION

The present invention provides an integrated process that combines biological $H_2S$ removal and membrane separation for the removal of acid gases and some oxygen from a broad range of raw biogas streams, including landfill gas and digester gas. A substantial fraction of acid gases, which may include carbon dioxide and hydrogen sulfide, are removed by a combination of biological $H_2S$ removal followed by a multistage membrane system. The individual separation unit operations of the integrated process and their combination are optimized to increase hydrocarbon recovery while removing the bulk of acid gas content to product specification. By combining these two purification technologies, it is possible to remove multiple contaminants at significantly lower operating costs.

Thus, it is an objective of the present invention to combine the biological $H_2S$ removal with a membrane separation process that removes the bulk of the carbon dioxide and reduces the oxygen content of the treated gas simultaneously. An effluent permeate stream generated by the membrane process enriched in oxygen content is directed to the biological treatment system and is used for beneficial $H_2S$ removal while simultaneously lowering demand for supplemental oxygen injection.

In one embodiment of the invention, the process for the purification of raw biogas stream containing methane, acid gases, and oxygen available at a substantially atmospheric pressure comprises the steps of:

(i) passing a combined feed gas stream comprised of a raw biogas feed stream and a recycled permeate gas stream generated by a membrane system and optionally a supplemental oxygen source stream through a biological hydrogen sulfide removal system at substantially atmospheric pressure, thus generating a first effluent stream with reduced hydrogen sulfide and oxygen content as compared to the combined feed gas stream;

(ii) compressing the first effluent stream in a compressor to a pressure from 6 to 25 barg followed by aftercooling and condensate separation, thereby forming a second effluent stream;

(iii) passing the second effluent stream into a first membrane separation unit, wherein a first membrane removes a portion of oxygen and carbon dioxide from the second effluent stream, thereby forming a retentate third effluent stream having a reduced content of carbon dioxide as compared to the second effluent stream and a permeate fourth effluent stream enriched in oxygen and carbon dioxide as compared to the second effluent stream;

(iv) passing the third effluent stream to a second membrane separation unit, wherein a second membrane removes a portion of carbon dioxide and oxygen from the third effluent stream, thereby forming a retentate fifth effluent stream having a lower carbon dioxide and oxygen content as compared to the third effluent stream and a permeate sixth effluent stream enriched in carbon dioxide and oxygen content as compared to the third effluent stream;

(v) wherein the permeate sixth effluent stream comprises the recycled gas stream combined with the raw biogas feed stream in step (i); and (vi) collecting the fifth effluent stream generated by the second membrane separation unit as a product, wherein the fifth effluent stream has an increased methane content and reduced hydrogen sulfide, oxygen and carbon dioxide content as compared to the raw biogas feed stream.

Raw biogas feeds can contain variable concentrations of oxygen and the oxygen concentration can vary over time. Frequently, the oxygen concentration is below 0.5%. This can lead to incomplete hydrogen sulfide removal. To enable efficient hydrogen sulfide removal a controlled amount of supplemental oxygen must be injected to convert hydrogen sulfide into elemental sulfur and sulfuric acid. The need for oxygen injection can be eliminated, or the supplemental oxygen amount can be reduced, by feeding the sixth effluent stream, generated by the membrane system, into the biological treatment unit. The sixth effluent stream contains oxygen concentration above that of the raw feed biogas stream. The membrane system is beneficial by removing oxygen from the process stream and by providing a source of needed oxygen to the biological hydrogen sulfide removal system. An adsorption-based hydrogen sulfide removal system can be further positioned upstream or downstream of the compressor to treat the first or the second effluent stream, respectively, and reduce the $H_2S$ concentration further if required. Preferably, the adsorption unit contains an activated carbon adsorbent impregnated with a substance that is characterized by catalytic activity for the oxidation of hydrogen sulfide in the presence of oxygen. Increased oxygen content in the biogas provides increased capacity and lifetime of the impregnated activated carbon.

The membrane separation units are equipped with polymeric membranes that permeate individual gas components at different rates affecting gas separation. The sixth effluent stream is enriched in oxygen content, as compared to the oxygen concentration in raw biogas, due to the preferential oxygen permeation through the polymeric membrane, as compared to methane permeation. For the most efficient separation of oxygen and carbon dioxide from methane by permeation, the polymeric membranes have a carbon dioxide/methane separation factor of 25 or above, preferably a carbon dioxide/methane separation factor of 35 and most preferably a carbon dioxide/methane separation factor of 45 or above as measured at room temperature conditions. For the most efficient separation of oxygen and carbon dioxide from methane by permeation, the membrane in the second membrane separation unit is a polymeric membrane with an oxygen/methane separation factor of 5 or above, and more preferably 6 or above. To manage the oxygen content in the biological desulfurization process, the sixth effluent stream is combined with the raw biogas feed stream in step (i).

It is within the scope of the invention to deploy an adsorption desulfurization unit downstream of the biological desulfurization unit to further reduce the concentration of hydrogen sulfide. Preferred adsorbents include impregnated activated carbons characterized by catalytic activity for the oxidation of hydrogen sulfide in the presence of oxygen. It is also within the scope of the invention to position the supplemental $H_2S$ removal adsorption unit following the first effluent stream compression.

To generate RNG that meets pipeline or customer product specifications, such as LNG or CNG, the fifth effluent stream can be treated further to reduce carbon dioxide concentration and/or remove additional impurities. This additional treatment may include processing the fifth effluent stream alternatively in an additional membrane separation unit, in an adsorption unit (including a pressure swing adsorption unit), or in an absorption unit. The permeate gas generated by the additional membrane unit and/or the blow-off gas generated by the PSA unit is recycled to the front end of the compressor to increase methane recovery.

Some product specifications, including pipeline specifications, have low oxygen content requirements that necessitate supplemental oxygen removal. In some embodiments of the invention, the fifth effluent stream is treated to remove residual oxygen in an oxygen removal system, such as the deoxo system, before being directed for utilization of further processing. The fifth effluent stream treated in the deoxygenation unit requires aftercooling, followed by condensate separation, and dehydration to remove water generated by the deoxo process.

To meet product specifications for the total concentration of inert components and heating value, excess nitrogen must be removed in some cases from the product gas. In such embodiments of the invention, the fifth effluent stream is treated to reject excessive nitrogen concentration in a nitrogen rejection system (NRU) before being directed for utilization or further processing.

The oxygen concentration in the feed biogas stream in some cases may be too low to enable efficient operation of the biological oxygen removal unit. In these cases, supplemental oxygen injection is required to enable $H_2S$ removal. The excess oxygen from the gas treated by the biological $H_2S$ removal unit is at least partially removed by the subsequent treatment of the gas in the membrane system and recycled into the biological treatment unit for beneficial utilization.

The above and other features of the invention, including various novel details of construction and combinations of parts, and other advantages, will now be more particularly described with reference to the accompanying FIGURE and pointed out in the claims. It will be understood that the particular methods and articles embodying the invention are shown by way of illustration and not as a limitation of the invention. The principles and features of this invention may be employed in various and numerous embodiments without departing from the scope of the invention.

BRIEF DESCRIPTION OF THE DRAWING

The FIGURE is a schematic drawing of one exemplary embodiment of the process of the invention wherein a low-pressure biogas gas containing acid gases $CO_2$ and $H_2S$ is treated in a system comprised of a biological hydrogen sulfide removal unit, refrigeration units to adjust water vapor dew point of the gas directed into the intake of the compressor and that of the compressed gas, an optional supplemental adsorption hydrogen sulfide removal unit not shown, a compressor, and a two-stage membrane unit that removes a fraction of carbon dioxide and oxygen, wherein the permeate from the second membrane separation unit is recycled to the biological hydrogen sulfide removal unit. The permeate gas stream from the second membrane separation unit is enriched in oxygen content as compared to the oxygen concentration in the feed raw biogas, the permeate stream is recycled to the biological desulfurization unit and the oxygen is beneficially utilized in $H_2S$ removal by the biological hydrogen sulfide removal system. An optional deoxygenation, deoxo, unit is further deployed to reduce RNG product oxygen content for low oxygen content product specification. In some embodiments, supplemental oxygen is injected into the bioreactor wherein the oxygen concentration of the raw feed biogas combined with the recycle stream is too low for efficient operation of the biological desulfurization unit.

DETAILED DESCRIPTION OF EXEMPLARY EMBODIMENTS

The method of the present invention provides an improved process of producing a product methane stream from biogas with a reduced acid gas ($CO_2$ and $H_2S$) and oxygen content. The acid gases are removed by a combination of a biological hydrogen sulfide removal system followed by a membrane separation process. The biological hydrogen sulfide removal system provides for the initial substantial hydrogen sulfide removal and consumes some oxygen in the process. Following $H_2S$ removal by the biological process, the treated gas water vapor dew point is reduced, preferably in a refrigerator dehumidifier, compressed, and treated in a multi-stage membrane system for the simultaneous removal of carbon dioxide and oxygen. The membrane system serves multiple functions—it removes undesirable carbon dioxide and oxygen from the conditioned biogas stream. At least a fraction of the gas streams generated by the membrane system enriched in oxygen content as compared to the oxygen concentration in the feed raw biogas is recycled to the biological hydrogen sulfide treatment unit to aid in biological activity.

The carbon dioxide concentration of the raw biogas varies from above 25% to as high as 60%, more commonly from 30% to 55%. The carbon dioxide must be removed, and the caloric value of the product gas increased, before gas utilization for direct heat and power generation or for injecting the RNG product into the distribution grid. The biogas treated by the biological H₂S removal system is compressed and treated in a multi-stage acid gas and oxygen removal system. The carbon dioxide concentration must be reduced to meet the local pipeline specification, which can vary from 5% to 2% mol. The retentate gas generated by the second membrane system may still contain an excess of carbon dioxide and thus is treated in an additional membrane stage. Alternatively, the excess carbon dioxide is removed by an absorption or a pressure swing adsorption system.

The anaerobic digestion of organic matter does not introduce oxygen into the biogas. Oxygen presence is commonly caused by air introduction with biomass loading and is affected by the loading process. For biogas from agricultural waste digesters, oxygen concentrations commonly are lower than 0.5%. For landfill gas, the concentrations of oxygen in the biogas can be as high as 5% due to difficulty in landfill hermitization.

Some biogas gas may contain a significant concentration of inert impurities, such as nitrogen. The product gas carbon dioxide concentration may need to be reduced further (below 2% pipeline specification) to meet the pipeline's total inert gas concentration limit. The excess nitrogen is removed in a post-purification step via a membrane or pressure swing adsorption (PSA) system.

The raw biogas stream typically contains a significant amount of hydrogen sulfide and other sulfur-containing impurities that must be removed to meet customer product specifications. The hydrogen sulfide concentration can be as low as 10 ppm or as high as 3% for some biogas streams. The content of hydrogen sulfide in biogas depends on the raw materials used, the fermentation process methodology, and the fermentation process protocol. In some cases, for example, during the fermentation of bioethanol production waste (vinasse), the hydrogen sulfide content can reach up to 30,000 ppmv. The biological desulfurization process can reduce the content of hydrogen sulfide in the processed biogas economically to about 100 ppmv or slightly below. The further reduction in hydrogen sulfide concentration is most economically accomplished by utilizing adsorption methodology. To meet the pipeline natural gas specification the concentration of impurities must be reduced to a typical pipeline specification of hydrogen sulfide: 0.25-0.3 g/100 scf (6-7 mg/m³); total sulfur: 5-20 g/100 scf (115-460 mg/m³); water vapor: 4.0-7.0 lb/MM scf (60-110 mg/m³), and oxygen: 1.0% or less with total non-hydrocarbons content of 2% or less. The product specifications for the methane to be converted into liquified natural gas (LNG) are more stringent. Typical requirements for the liquifying purposes: hydrogen sulfide concentration 1 ppmv; water vapor concentration of 1 ppmv; and carbon dioxide concentration 50 ppmv.

Direct use of biogas in energy generation is limited due to the presence of hydrogen sulfide (H₂S). Most of the conventional techniques employed in the removal of H₂S have a chemical base, with high material costs and secondary pollutant generation. Biological processes for H₂S removal have become effective and economical alternative techniques to traditional gas-treatment systems based on physicochemical techniques. Biological hydrogen sulfide removal is an efficient method of biogas treatment. It is largely known that the most appropriate bacterial species for biogas purification are the chemoautotrophic bacteria. Several chemoautotrophic bacteria are suitable for the biodegradation of H₂S. These bacteria grow and produce a new cellular material using inorganic carbon (CO₂) as a source of carbon and obtain chemical energy from the oxidation of inorganic compounds, such as H₂S. Among the chemoautotrophic bacteria, the sulfur-oxidizing bacteria, such as *Thiobacillus, Acidithiobacillus, Achromatium, Beggiatoa, Thiothrix, Thioplaca, Thiomicrospira, Thiosphaera, Thermothrix*, and others, are utilized. Bacteria of the genus *Thiobacillus* or *Acidithiobacillus* are the most suitable for the treatment of gases containing H₂S because they require fewer nutrients and have optimum activity in the acidic pH. The main characteristics that the bacteria should have are the following: the ability to convert H₂S to S₀ and preferably to H₂SO₄; low nutrient requirement; easiness in the separation of S₀ and H₂SO₄ from biomass; low biomass accumulation; and high resistance to fluctuations in pH, temperature, moisture, polluting load, and O₂ demand.

Oxygen is the critical enabling component in hydrogen sulfide oxidation and removal. Oxygen is the prerequisite to enable H₂S oxidation and removal and proceeds according to the following mechanisms:

$$H_2S + 0.5O_2 \rightarrow S^0 + H_2O$$

$$H_2S + 2O_2 \rightarrow SO_4^{2-} + 2H^+$$

The process proceeds with H₂S oxidation to elemental sulfur and/or sulfuric acid. The oxygen supply and process conditions determine the balance between sulfur and sulfuric acid formation. However, the raw biogas frequently contains insufficient and/or fluctuating oxygen content that requires a supplemental oxygen injection. The process of the instant invention provides for improved management of oxygen in the biological desulfurization process by combining biological hydrogen sulfide removal with a membrane gas separation process. The membrane system serves multiple functions—it removes undesirable carbon dioxide and excess oxygen from the processed biogas stream while directing the removed oxygen back into the biological treatment unit. The oxygen supply to the biological desulphurization unit by the method of the invention consists of the initial oxygen contained in the biogas, the recycled gas stream enriched in oxygen content generated by the membrane system, and supplemental oxygen from an external oxygen source added on needs bases. The recycle membrane stream reduces the need for external oxygen addition and, in some cases, the need for oxygen addition is eliminated.

Raw biogas is commonly available at substantially atmospheric pressure. The pressure of the raw biogas may be increased by way of a gas blower prior to being fed into the biological treatment unit, but typically will not exceed 0.5 barg. Certain gas impurities can be removed before the biological treatment. In one example, the ammonia present in the biogas is removed by way of a water wash prior to the biogas being treated in the biological hydrogen sulfide removal unit. Some raw biogas streams contain a significant amount of ammonia that is commonly removed upstream of the acid gas removal steps. For intensification of upstream ammonia removal, the sour wastewater from the biological desulfurization process can be used in the ammonia removal process since ammonia reacts with sulfuric acid to form ammonium salts.

Low-pressure biogas gas processed in the biological hydrogen sulfide removal unit must be compressed before the gas is treated in membrane systems by the method of the invention. The raw feed gas is treated in the biological hydrogen sulfide removal unit prior to compression. The raw feed gas is compressed to a pressure from about 6 barg to about 25 barg prior to being treated by the method of the invention in the membrane separation units.

The feed biogas is usually saturated with water vapor. The water vapor content must be reduced to ensure the reliable operation of the compression equipment. The water vapor pressure must be reduced as well for the first stage of the membrane separation system and to ensure reliable operation of the adsorption hydrogen sulfide removal unit that utilizes impregnated activated carbon adsorbent for the supplemental hydrogen sulfide removal step. The water dew point control of the product retentate gas generated by the membrane system usually is not required. Membranes act as efficient gas dehydrators due to the high water permeability through polymeric gas separation membranes. However, a supplemental dehydration step of the product gas may be required if additional water is generated during the deoxygenation step, or the product gas is sent for liquefaction.

The raw feed biogas can further contain several additional impurities in variable concentrations that must be removed before the gas is treated by membrane units before and/or following compression. These impurities may include siloxanes and volatile organic hydrocarbons among others. These impurities are removed by methods well-known in the art and can include adsorption by activated carbon. It is also within the scope of the invention to remove some impurities prior to compression while removing the rest of the impurities following compression.

The membrane separation units are comprised of one or more membrane separation modules arranged in series or in parallel. The membrane gas separation characteristics in membrane separation units one and two can be the same or different. The first membrane in the first membrane separation unit is a polymeric membrane with an oxygen/methane separation factor of 4 or above and a carbon dioxide/methane separation factor of 25 or above and the second membrane in the second membrane separation unit is a polymeric membrane with an oxygen/methane separation factor of 5 or above and a carbon dioxide/methane separation factor of 25 or above. Preferably, the first membrane in the first membrane separation unit is a polymeric membrane with an oxygen/methane separation factor of 6 or above and a carbon dioxide/methane separation factor of 40 or above and the second membrane in the second membrane separation unit is a polymeric membrane with an oxygen/methane separation factor of 5 or above and a carbon dioxide/methane separation factor of 25 or above.

It is further within the scope of the invention to deploy membranes with different separation characteristics in the first and second membrane separation units. The membrane units in stages one and two can further differ in membrane gas processing area size leading to different gas processing capacities as compared to one another. The second stage membrane separation unit can be configured to concentrate $O_2$ in the permeate stream directed into the biological hydrogen sulfide removal unit while removing carbon dioxide into the low-pressure permeate stream with $CO_2/O_2$ selectivity above 5. The operating temperature in each membrane stage may be the same or different to optimize the overall separation efficiency. The gas may be preheated or cooled between stages to control the temperature.

The membranes preferably operate in a counter-current mode to increase separation thermodynamic efficiency and reduce methane loss. Each module has a polymeric membrane with a defined high-pressure side and a low-pressure side, and each module has an inlet port connected to the high-pressure side, a retentate outlet port, and a permeate outlet port, therein the retentate outlet port providing an outlet for gas on the high-pressure side, and the permeate outlet port providing an outlet for gas on the low-pressure side. The feed gas is conveyed into the inlet port, the retentate gas is conveyed from the retentate outlet port, and the permeate gas is conveyed from the permeate port.

The fraction of the feed gas conveyed to the membrane permeate side is controlled by a valve positioned on the retentate line to affect retentate product purity. The ratio of the permeate gas volume to the feed gas volume (the stage cut) controlled by a valve positioned on the retentate line can be the same for all membrane stages or different. The retentate valves are used to control the stage cut of each membrane unit that, in turn, controls the concentration of oxygen and carbon dioxide in the retentate product streams. In the case of a sequential arrangement of two or more membrane units wherein the retentate of one unit serves as a feed gas for the next membrane unit, the stage cuts can be determined by one valve positioned on the retentate of the downstream membrane unit.

The methane product stream treated by the combination of the biological hydrogen sulfide removal unit combined with membrane separation units may contain a hydrogen sulfide concentration above the product specification. The gas may be treated in an additional adsorption unit to further reduce the hydrogen sulfide concentration. Thus, the thirst effluent product stream can be further treated in the adsorption $H_2S$ removal unit. Alternatively, the adsorption $H_2S$ removal unit may be used to treat the second effluent stream by positioning the adsorption unit in front of the first membrane separation unit following gas compression. The adsorption unit can be equipped with activated carbon and impregnated activated carbon materials utilized for $H_2S$ removal well known in the art.

The biogas treated by the combination of the biological hydrogen sulfide removal unit and the membrane system may contain an oxygen content over the product specification. Oxygen removal may be required to meet pipeline specifications. Oxygen removal can be further carried out utilizing a thermal deoxidizer unit.

The process of the invention is further described in the following example with the reference to process design configuration as outlined in the FIGURE. The raw biogas (101) is treated by the process of the instant invention to remove hydrogen sulfide, carbon dioxide, and a fraction of oxygen to generate RNG. The raw feed biogas (101) has the following initial gas composition—$CO_2$ concentration of 41.95% (mol.), hydrogen sulfide concentration of 500 ppmv, nitrogen concentration of 1.5% (mol.), oxygen concentration of 0.3% (mol.), and balance methane. The feed biogas stream (101) with a volumetric flow of 1080 m³/h at normal conditions (all volumetric flows are reported at normal conditions) is combined with the permeate recycle sixth effluent stream (112) from the second membrane separation unit (111). The sixth effluent stream (112) has a volumetric flow of 558.2 m³/h and the following gas composition: $CO_2$ concentration of 53.48% (mol.), hydrogen sulfide concentration of 55 ppmv, nitrogen concentration of 3.26% (mol.), oxygen concentration of 1.02% (mol.), methane concentration of 42.21% (mol.) and water vapor concentration of 255 ppmv. The supplemental oxygen gas stream (116) with the following gas composition-oxygen 90% and nitrogen 10% and the flow volume of 0.8 m³/h is added to the combined stream to maximize $H_2S$ removal efficiency. Thus, generated blended feed flow of 1639 m³/h with the following gas composition: $CO_2$ concentration of 43.81% (mol.), hydrogen sulfide concentration of 324 ppmv, nitrogen concentration of 2.03% (mol.), oxygen concentration of 0.57% (mol.), methane concentration of 48.67% (mol.) and water vapor concentration of 4.89% (mol.) is directed to the intake of the biological hydrogen sulfide removal unit (102).

The required oxygen content for an efficient $H_2S$ removal in the incoming gas by a biological process is above 0.5%. The average oxygen concentration of the combined blended feed gas to the biological desulfurization unit is 0.57% (mol.), which is sufficient for $H_2S$ removal and support of bacteria vitality. Following the biological desulfurization process, the oxygen concentration in the first effluent stream (103) is decreased to 0.51% (mol.) which is a result of oxygen consumption by the biological process.

The average oxygen concentration in the bioreactor is controlled and maintained at a constant level. The oxygen concentration in the first effluent gas stream (103) at the outlet of the biological desulfurization unit (102) is measured continuously and the oxygen concentration is adjusted by the control system by adjusting the supply of the supplemental oxygen injected. To ensure an acceptable level of acidity and uninterrupted removal of the hydrogen sulfide oxidation products, 0.25 m³/h of water is supplied to the biological desulphurization system, and the runoff water containing the dissolved sulfuric acid and small amounts of suspended elemental sulfur is discharged. Supplemental heat is provided as needed to maintain bioreactor operation at a constant 35° C. temperature.

The average hydrogen sulfide content of the first effluent stream (103) is 32 ppmv and can vary from 10 to 50 ppmv depending on feed gas flow volume and composition fluctuations and biological activity fluctuations. The hydrogen sulfide is further removed by the first membrane separation unit (108) and concentrated in the carbon dioxide-enriched fourth effluent stream (110). Before dispersion into the atmosphere, the fourth (110) effluent stream is treated in a thermal oxidizer. In some embodiments, the hydrogen sulfide concentration is further reduced by treating the gas in a supplemental hydrogen sulfide adsorption-based unit. The adsorption unit can be positioned before or following the first effluent stream's compression.

The first effluent stream (103) processed in the biological desulfurization unit (102) is water vapor saturated at process temperature +35° C. The first effluent stream (103) is treated in the refrigeration unit (104) by cooling the gas to 10° C. temperature to reduce the water vapor dew point with the condensed water separated. The resulting flow after dehumidification is 1577 m³/h.

The first effluent stream with a reduced water dew point is directed to the intake of the compressor (105) and compressed to the pressure of 12.7 barg, the compressed gas is further treated in an aftercooler to reduce the temperature to 35° C. with subsequent condensate removal.

The compressed gas is treated in a refrigeration unit (106) to reduce water vapor dew point. The gas is cooled to +10° C. with the condensed water separation and the gas is superheated to +20° C., thus forming the second effluent stream (107).

The second effluent stream (107) with $CO_2$ concentration of 46.07% (mol.), nitrogen concentration of 2.086% (mol.), oxygen concentration of 0.53% (mol.), hydrogen sulfide concentration of 34 ppmv, water vapor concentration of 0.1% (mol.) and balance methane, and a volumetric flow of 1559 m³/h is treated in the first membrane separation unit (108) to remove carbon dioxide thus forming the third retentate effluent stream (109) of a reduced $CO_2$ and the fourth permeate effluent stream (110) enriched in $CO_2$. The third retentate effluent stream (109) with a volumetric flow of 1122 m³/h has the following composition: carbon dioxide 26.99% (mol.), nitrogen 2.78% (mol.), oxygen 0.545% (mol.), hydrogen sulfide concentration of 27 ppmv, water 200 ppm and balance methane. The fourth permeate effluent stream (110) with a volumetric flow of 436.4 m³/h has the following gas composition: carbon dioxide 95.12% (mol.), nitrogen 0.301% (mol.), oxygen 0.492% (mol.), water 0.3% (mol.), hydrogen sulfide concentration of 51 ppmv, and methane (3.79%). The stream (110) is sent to a thermal oxidizer to prevent $CH_4$ and $H_2S$ emissions followed by atmospheric dispersion.

The third retentate effluent stream (109) is directed into the second membrane separation unit (111) that generates the retentate fifth effluent stream (115) and the sixth permeate stream (112) wherein the permeate stream is maintained at the inlet biogas pressure. The third effluent stream (109) is heated to +35° C. before being introduced into the second membrane separation unit (111) is used to minimize the required membrane separation area of the stage. The fifth retentate stream (115) has the following gas composition: carbon dioxide 0.8% (mol.), nitrogen 3.213% (mol.), oxygen 0.092% (mol.), water 20 ppmv, hydrogen sulfide 1 ppmv, and balance methane (96.75%) at a volumetric flow of 564 m³/h. The sixth permeate stream (112) with a volumetric flow of 558.2 m³/h has the following gas composition: carbon dioxide 53.45% (mol.), nitrogen 2.35% (mol.), oxygen 1.02% (mol.), water 380 ppmv, hydrogen sulfide 55 ppmv, and balance methane. The sixth permeate effluent stream (112) is recycled to the front end of the biological hydrogen sulfide removal unit (102).

The control valve (113) is used for the stage cut control that, in turn, controls the $CO_2$ and/or $O_2$ product purity. The valve (113) is algorithmically incrementally opened to increase the product RNG flow which leads to an increase in $CO_2$ and/or $O_2$ product concentration. The valve (113) is incrementally closed to decrease the product RNG flow which leads to a decrease in $CO_2$ and/or $O_2$ concentration in the product gas. The valve (113) regulates the stage cut of the second membrane separation unit (111) directly and simultaneously of the first membrane separation unit (108) indirectly. The system's operational characteristics are further controlled by controlling the temperature of each membrane separation unit individually. The gas permeance of individual components of the gas mixture is temperature dependent and the temperature adjustments can be used to affect separation efficiency, productivity, and the stage cut. For turndown management, a fraction of the membrane surface in a given stage is switched off by removing a desired number of membrane cartridges per stage.

The required residual oxygen content of the retentate fifth effluent stream (115) is determined by the product specification and can vary from 5 ppmv to 1% (mol). For a low residual oxygen product specification, the retentate fifth effluent stream (115) is treated in thermal deoxygenation, deoxo, unit (114), where the gas is heated to a temperature of between 300 to 350° C., the oxygen is reacted with hydrocarbons in presence of a catalyst followed by cooling of the gas and drying to the required consumer product specification. For low oxygen content products, the content of residual oxygen varies from 5 to 50 ppmv and is determined by the customer product specification.

The fifth effluent stream (115) meets the common RNG product specification and is collected at a pressure of 10.9 barg and temperature of +30° C.

The content of the residual nitrogen in the RNG product is determined by the customer specification and/or by the product heating value. For biogas streams with a high nitrogen content, the fifth effluent stream (115) is treated in a nitrogen rejection unit to meet product specifications.

For applications that require a low residual content of acid gases, such as LNG production, the fifth effluent stream (115) is directed to a supplemental acid gas removal unit that may be a membrane unit, an absorption unit, or a pressure swing adsorption unit. In some embodiments tail gases enriched in acid components are recycled to increase methane recovery and combined with the first effluent stream (103).

The present invention is described with reference to the FIGURE and several embodiments, which should not be construed as limiting the present invention.

The invention claimed is:

1. A process for removing acid gases from a raw biogas feed stream comprised of methane, carbon dioxide, nitrogen, oxygen and hydrogen sulfide, said process comprising the steps of:
   (i) passing a combined feed gas stream comprised of the raw biogas feed stream and a recycled permeate gas stream generated by a membrane separation unit through a biological hydrogen sulfide removal system at substantially atmospheric pressure, thus generating a first effluent stream with reduced hydrogen sulfide and oxygen content as compared to the combined feed gas stream;
   (ii) compressing the first effluent stream in a compressor to a pressure from 6 to 25 barg, thereby forming a second effluent stream;
   (iii) passing the second effluent stream into a first membrane separation unit, wherein a first membrane removes a portion of oxygen and carbon dioxide from the second effluent stream, thereby forming a retentate third effluent stream having a reduced content of carbon dioxide as compared to the second effluent stream and a permeate fourth effluent stream enriched in oxygen and carbon dioxide as compared to the second effluent stream;
   (iv) passing the third effluent stream to a second membrane separation unit, wherein a second membrane removes a portion of carbon dioxide and oxygen from the third effluent stream, thereby forming a retentate fifth effluent stream having a lower carbon dioxide and oxygen content as compared to the third effluent stream and a permeate sixth effluent stream enriched in carbon dioxide and oxygen content as compared to the third effluent stream;
   (v) wherein the sixth effluent stream comprises the recycled permeate gas stream combined with the raw biogas feed stream in step (i); and
   (vi) collecting the fifth effluent stream generated by the second membrane separation unit as a product, wherein the fifth effluent stream has an increased methane content and reduced hydrogen sulfide, oxygen and carbon dioxide content as compared to the raw biogas feed stream,
   wherein the first membrane in the first membrane separation unit is a polymeric membrane with an oxygen/methane separation factor of 4 or above and a carbon dioxide/methane separation factor of 25 or above and the second membrane in the second membrane separation unit is a polymeric membrane with an oxygen/methane separation factor of 5 or above and a carbon dioxide/methane separation factor of 25 or above.

2. The process of claim 1 wherein at least one of the first effluent stream and the second effluent stream is treated in an adsorption unit to remove additional hydrogen sulfide not removed in the biological hydrogen sulfide removal system.

3. The process of claim 1 wherein a supplemental oxygen-containing gas is injected into the biological hydrogen sulfide removal system to facilitate hydrogen sulfide removal.

4. The process of claim 1 wherein the first membrane in the first membrane separation unit is a polymeric membrane with an oxygen/methane separation factor of 6 or above and a carbon dioxide/methane separation factor of 40 or above and the second membrane in the second membrane separation unit is a polymeric membrane with an oxygen/methane separation factor of 5 or above and a carbon dioxide/methane separation factor of 25 or above.

5. The process of claim 1 wherein the fifth effluent stream is treated in a deoxygenation unit followed by aftercooling and dehydration.

6. The process of claim 1 wherein the fifth effluent stream is treated in a nitrogen rejection unit.

7. The process of claim 1 wherein the first membrane separation unit and the second membrane separation unit have different gas processing capacities as compared to one another.

8. The process of claim 1 wherein an oxygen concentration in the raw biogas feed is below 5% by volume, a carbon dioxide concentration in the raw biogas feed is above 25 volumetric percent and a hydrogen sulfide concentration in the raw biogas feed is from 100 to 30,000 ppmv.

9. The process of claim 1 wherein the first effluent stream is treated to reduce water vapor concentration prior to or following compression.

10. An apparatus for the purification of a raw biogas stream comprised of methane, carbon dioxide, oxygen, nitrogen and hydrogen sulfide, said apparatus comprising:
    (i) a biological hydrogen sulfide removal unit that treats a combined feed gas stream comprised of the raw biogas stream combined with at least one recycled permeate gas stream, thus forming a first effluent stream;
    (ii) a compressor that receives the first effluent stream and compresses the first effluent stream to a pressure from 6 to 25 barg, thereby forming a second effluent stream;
    (iii) a first membrane separation unit that receives the second effluent stream, the first membrane separation unit comprising a first membrane that removes a portion of carbon dioxide and oxygen from the second effluent stream, thereby forming a retentate third effluent stream having a lower carbon dioxide content as compared to the second effluent stream and a permeate fourth effluent stream enriched in carbon dioxide and oxygen as compared to the second effluent stream;
    (iv) a second membrane separation unit that receives the third effluent stream, the second membrane separation unit comprising a second membrane that removes a portion of carbon dioxide from the third effluent stream, thereby forming a retentate fifth effluent stream having a lower carbon dioxide and oxygen content as compared to the third effluent stream and a permeate sixth effluent stream enriched in carbon dioxide and oxygen content as compared to the third effluent stream;
    (v) wherein the sixth effluent stream is recycled and comprises the recycled permeate gas stream combined with the raw biogas stream to define the feed gas stream treated by the biological hydrogen sulfide removal unit; and
    (vi) wherein the fifth effluent stream generated by the second membrane separation unit is collected as a product wherein the fifth effluent stream has an increased methane content and reduced hydrogen sulfide, oxygen and carbon dioxide content as compared to the raw biogas feed stream, wherein the first membrane in the first membrane separation unit is a polymeric membrane with an oxygen/methane separation factor of 4 or above and a carbon dioxide/methane separation factor of 25 or above and the second membrane in the second membrane separation unit is a polymeric membrane with an oxygen/methane separation factor of 5 or above and a carbon dioxide/methane separation factor of 25 or above.

11. The apparatus of claim 10 further comprising an adsorption unit that treats at least one of the first effluent stream and the second effluent stream to remove additional hydrogen sulfide not removed in the biological hydrogen sulfide removal system.

12. The apparatus of claim 10 further comprising a source of supplemental oxygen-containing gas that is injected into the biological hydrogen sulfide removal system to facilitate hydrogen sulfide removal.

13. The apparatus of claim 10 wherein the first membrane in the first membrane separation unit is a polymeric membrane with an oxygen/methane separation factor of 6 or above and a carbon dioxide/methane separation factor of 40 or above and the second membrane in the second membrane separation unit is a polymeric membrane with an oxygen/methane separation factor of 5 or above and a carbon dioxide/methane separation factor of 25 or above.

14. The apparatus of claim 10 further comprising a deoxygenation unit followed by aftercooling and dehydration units that remove oxygen from the fifth effluent stream.

15. The apparatus of claim 10 further comprising a nitrogen rejection unit that treats the fifth effluent stream.

16. The apparatus of claim 10 wherein the first membrane separation unit and the second membrane separation unit have different gas processing capacities as compared to one another.

17. The apparatus of claim 10 wherein an oxygen concentration in the raw biogas feed is below 5% by volume, a carbon dioxide concentration in the raw biogas feed is above 25 volumetric percent and a hydrogen sulfide concentration in the raw biogas feed is from 100 to 30,000 ppmv.

18. The apparatus of claim 10 further comprising aftercooling and condensate removal units that reduce water vapor concentration in the first effluent stream prior to or following compression.

* * * * *